April 30, 1940.  E. H. V. NOAILLON  2,198,678
ART OF MAKING STEREOSCOPIC PROJECTION OF PICTURES
Filed June 25, 1937  2 Sheets-Sheet 1
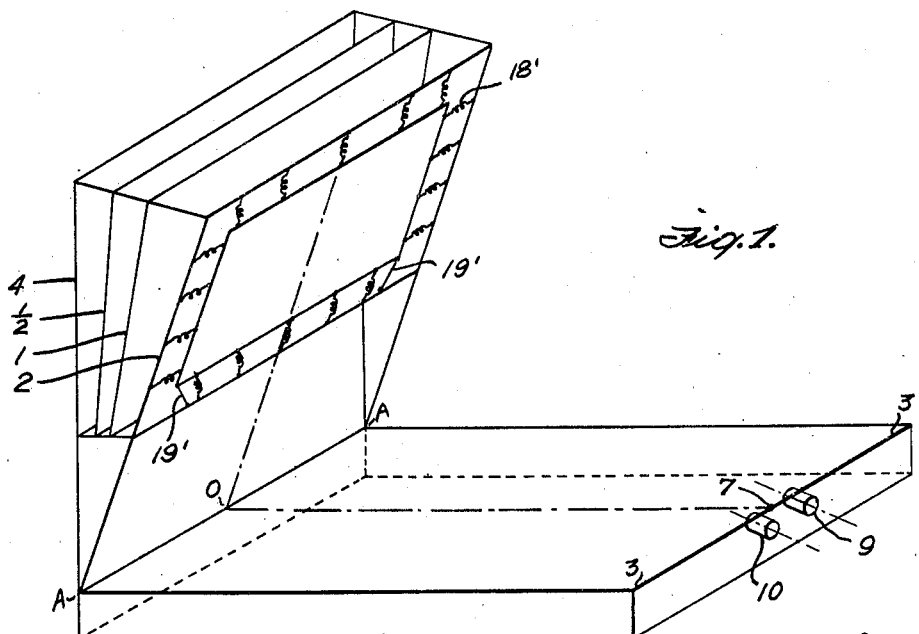
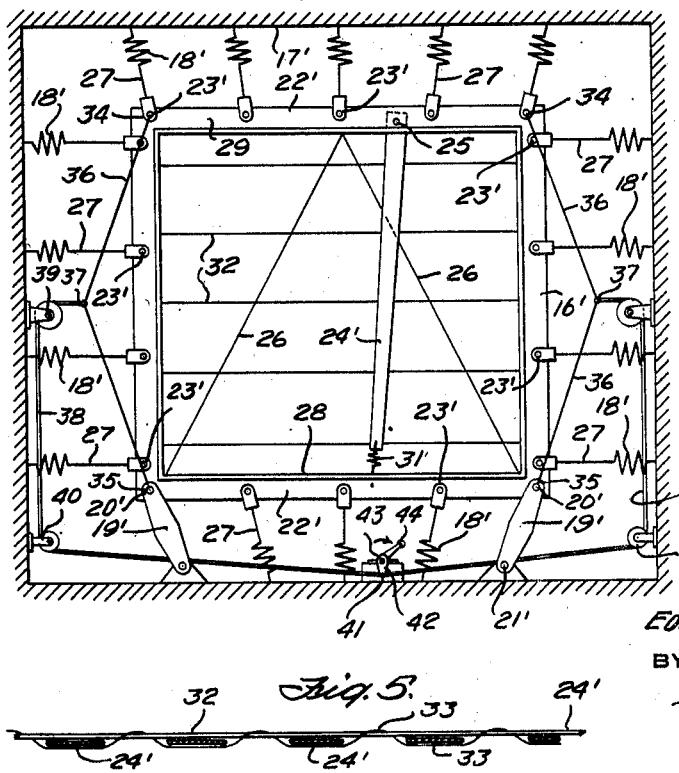
INVENTOR
EDMOND H.V. NOAILLON
BY
ATTORNEY

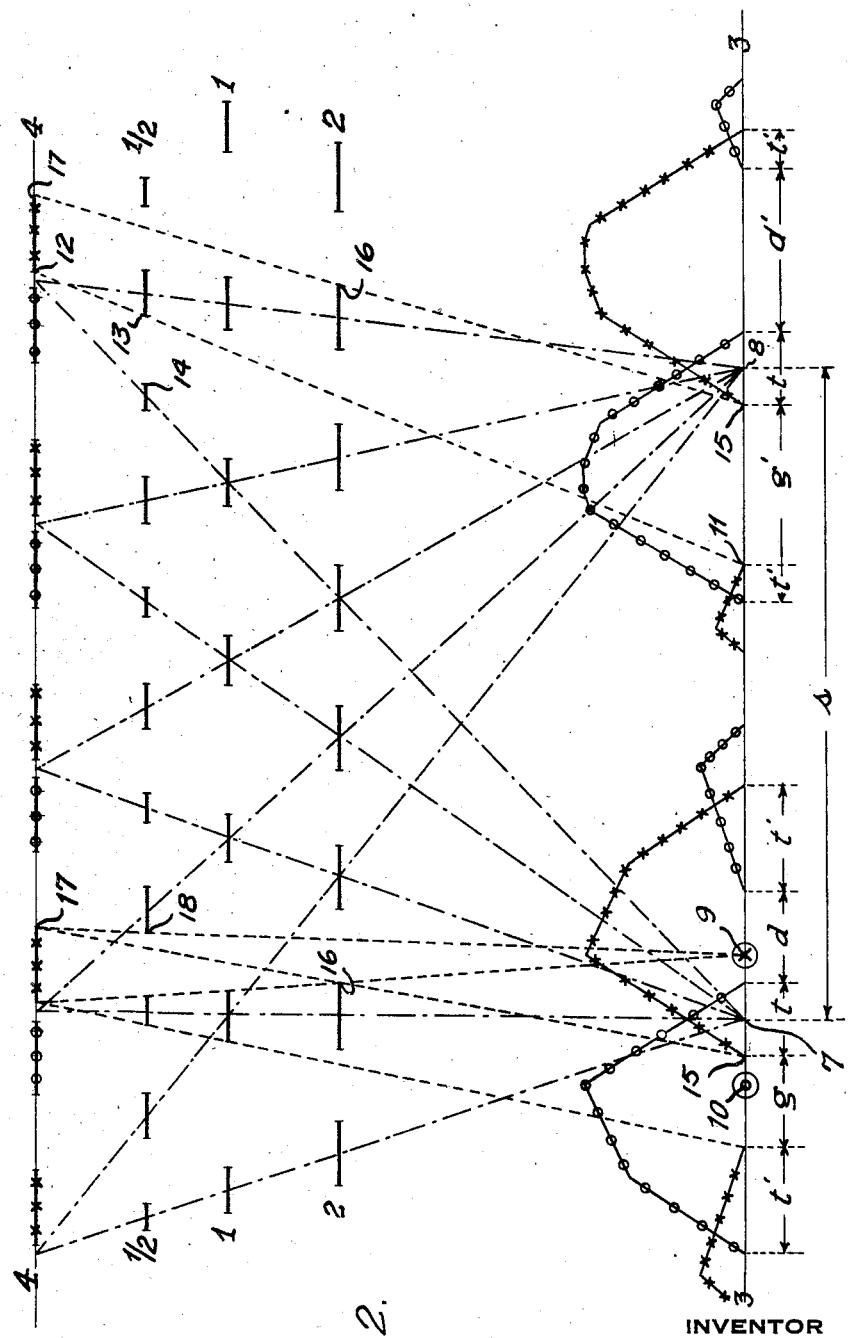

Patented Apr. 30, 1940

2,198,678

UNITED STATES PATENT OFFICE 2,198,678

ART OF MAKING STEREOSCOPIC PROJECTION OF PICTURES

Edmond Henri Victor Noaillon, Brussels, Belgium

Application June 25, 1937, Serial No. 150,219
In Germany June 26, 1936

4 Claims. (Cl. 88—16.6)

My invention relates to improvements in the devices for the stereoscopic projection of pictures and in particular to kinematographic projection in which two series of pictures are thrown simultaneously or in succession on to a screen of which series one corresponds to the picture obtained by the right eye and is only to be seen by the right eye of a spectator while the other series corresponds to the picture seen by the left eye and similarly is only to be seen by the left eye of the spectator in question.

This result has been previously obtained by one or more filters arranged between the screen and the spectator, these filters having plane surfaces and being made up of a series of strips the edges of which converge towards a common point and are uniformly spaced apart, their mean direction being approximately vertical.

The filters are reciprocated in their own planes in a direction perpendicular to the mean direction of the strips.

It is known that in such a process, if all the filters meet the screen along a common line of intersection which may be called A, if all the strips of all the filters converge towards the same point 0 in the line A and if moreover the filters are suitably disposed, there will exist a plane of vision passing through the straight line A and through the objectives of the projectors and in this plane there will exist zones in which one only of the two images projected on the screen will be seen. These zones have the form of strips limited by the straight lines which converge towards the point 0. The straight line in the plane of vision passing through the objectives of the projectors will cut all the zones of vision in such a manner as to form equal segments.

Hereinafter it will be called vision lines, the straight lines arranged symmetrically between the vision zones and having on the right side a zone of vision for the right eye and on the left side a zone of vision for the left eye; in fact, the spectator's eyes must be situated so that one eye is on one side of those lines and the other eye on the other side, the said lines being situated in the vision plane and converging towards the point 0.

The present invention has for its object to secure vision zones of a great width and of a great brightness principally by reducing in a considerable extent the undesirable effect of penumbra which border the picture zones, the said penumbra being produced by the projector objectives because they are not point sources of light.

On the annexed drawings:

Fig. 1 is a diagrammatic view showing in perspective the relationship between the reflecting screen, projectors and filters as they would be disposed in a cinema hall.

Fig. 2 is a plan view showing the arrangement of the filters and their cooperation with the screen and with the projection apparatus.

Fig. 3 shows a filter as seen in elevation.

Fig. 4 shows a vertical cross section therethrough, this being a filter whose strips are downwardly converging.

Fig. 5 is a horizontal section on a larger scale and shows only a part of a filter.

The apparatus according to the invention comprises a reflecting screen 4 (Fig. 1) in front of which filters are arranged. The filters are designated by reference numerals 1/2, 1 and 2, and are so tilted that the planes of the filters when extended to their line of intersection will meet with the extended plane of the screen 4 in a common horizontal line A—A. The point 0 which is located on line A—A is the point on which the edges of all the filter strips mounted on said filters would meet if the same were extended.

Figure 2 represents the relative position of the projectors, filters, filter strips, screen and images thereon as projected onto a plane passing through the projection lenses of the projectors horizontally through the screen and filters. In order to better show the various outlines the abscissa have been drawn on a larger scale than the ordinates of Figure 2. In this figure, the line 4 and the lines 1/2, 1 and 2 relate only to one small portion of the screen and filters and it would be necessary to extend Figure 2 towards the right and left in order to illustrate the entire screen and filters. In Figure 2 the projection lenses of the projectors are represented as being located at the points 9 and 10 which are situated on the horizontal line 3 in the plane of vision. These projection lenses project simultaneously two conjugated pictures on the screen 4 through the slits between the filter strips.

Conjugated pictures are two pictures which are obtained simultaneously when taking two stereoscopic views by means of an apparatus consisting of twin cameras and the lenses of which are situated on the same horizontal line and at a distance from each other corresponding approximately to the distance between a person's eyes. As previously mentioned, the plane of vision is the plane passing through line 3—3 of Figure 2 and through the horizontal line A—A constituting the common intersection of the planes of the screen and filters. All the strips of filter 1 are of the same width when measured on the same horizontal line. In the same manner all the strips of the filter 2 have the same width. The strips of the filter 1/2 however are strips of narrow width alternating with strips of a wider width.

The strips of the filters are arranged so that if the middle points of the strips of the filters 1 and 2 and the middle points of the narrow strips of the filter 1/2 are connected by straight lines, the latter meet on the horizontal line 3 at points 7 which are situated at distances 2 s the one from the other.

Although only one point 7 may be seen in Figure 2, there is in reality a number of other like points which would be situated on an extension of line 3 in the relationship previously described.

If the middle points of the strips of filters 1 and 2 and the middle points of the wide strips of filter 1/2 are connected by straight lines, the latter meet on the horizontal line 3 at points 8 situated at an equal distance between the points 7.

The objectives 9 and 10 of the projectors situated on the horizontal line 3 on each side and at equal distances of a point 7 project bright strips on the screen and through the filters.

The objective 9 throws on the screen light strips which are indicated by thick lines provided with crosses and the objective 10 projects on the screen light strips which are indicated by thick lines provided with circles.

On the horizontal line 3, the brightness of the vision zones at each point, which is proportional to the length of the segments of the bright strips which are seen from that point is indicated by the ordinate at this point of the brightness diagrams. The brightness diagrams which correspond to the objective 9 are provided with crosses and those which correspond to the objective 10 are provided with circles.

It will be seen that the vision zones are symmetric with respect to the points 7 and 8. The result is, according to what has been said in the preamble, that the lines connecting the points 7 and 8 to the converging point 0 are vision lines.

It will be seen that the brightness diagrams of the objectives 9 and 10 will be superimposed in the zones or regions in $t$ and $t'$ in which the right-hand image and the left-hand image will be seen at the same time. The zones $t$ and $t'$ are therefore the cause of difficulty because in them both of the two images will be seen by both eyes. The spectator's eyes must consequently not be in those regions.

The regions $d$, $d'$ and $g$, $g'$ are the exclusive vision regions or zones (right-hand and left-hand) and in order to have a good stereoscopic vision each spectator must have his right-hand eye in one region $d$ or $d'$ and his left-hand eye in one zone $g$ or $g'$.

In order that the spectator could be able to have a comfortable vision and he could move his head whilst keeping the stereoscopic vision, the ratios $$\frac{d}{t} \text{ and } \frac{d'}{t}$$

must be of a value as large as possible. It is easy to see those ratios are of a greater value for the vision lines 8 than for the vision lines 7.

If all the strips of filter 1/2 were narrow ones, it is easy to see the regions $t$ would be very much wider.

Moreover, if the objectives were situated on each side of points 8, it is easy to understand that less favorable brightness diagrams and much wider zones $t$ would be obtained.

And if the strips of filter 1/2 were wide strips, the bright strips thrown on the screen would be less wide and the images would be less luminous.

In consequence, it is easy to see that it is because the filter 1/2 possesses narrow and wide strips that exclusive vision regions $d'$ and $g'$ situated on each side of the points 8 are much wider than the corresponding regions $d$ and $g$ situated on each side of the points 7.

The point 11 limiting the zone $g'$ is determined by the straight line 12, 11 which comes into contact with the edge 13 of a wide strip; this point 11 would be very much nearer from 8 if this point 13 would belong to a narrow strip.

Moreover, if the strip 14 were also a wide strip, the space between the two strips would be smaller and the brightness diagrams situated on each side of the points 8 would have smaller ordinates.

It is consequently easy to understand what is the advantage to have a filter provided with wide and narrow strips.

It has been supposed hereinabove the objectives of the projectors were constituted by points; in fact, their diameter cannot be neglected and the bright strips of the screen are surrounded by penumbra which in turn produce in the plane of vision penumbra on the edges of the vision zones.

In order to keep to the ratios $$\frac{d}{t}, \frac{d'}{t'}$$

a value as large as possible, the penumbra at the edges 15 of the zones $t$ must be as low as possible.

In order to secure small penumbra at 15 it is necessary the two following conditions be met:

(a) The edge 16 of the strips limiting on the left-hand side on the horizontal line 3 the vision of the points 17 must be situated on the filter which is the most remote from the screen.

(b) In order that the penumbra at 17 be as little as possible, the edge 18 of the strips (limiting on the right-hand side at 17 the bright strips of the screen) must be situated on the filter which is as close as possible to the screen.

It will be understood that those two conditions are obtained when use is made of an arrangement of the filters as shown on Figure 2.

By the use of the narrow strips of the filter 2, it is possible to obtain wide picture strips and therefore images of a great brightness and by the use of the wide strips of the filter 2 it is possible to obtain vision zones of great width.

Previously the surfaces of the strips exposed to the light from the projection apparatus were covered with a dull black colouring matter in order to absorb the light received. No dull black colouring matter, however, completely absorbs the light, which is in part dispersed from the surface thereby giving rise to a very undesirable supplementary image.

In order to avoid this the filters are covered with a glossy black lacquer. The surface covered with this lacquer then reflects practically all the light which is not absorbed and prevents the formation of the additional image. In this case however it is necessary to give a sufficient inclination to the filters for the rays reflected from them to reach the floor in front of the spectator so that the latter is not troubled by them.

As has been mentioned it is necessary in order to use a number of connected filters to reduce the force exerted by the devices which impart to them their oscillatory motion to as great an extent as possible. For this purpose each filter has a rectangular- or trapeze-shaped frame 16' (Fig. 3-4) formed by four angle irons which are connected by mitred joints and have their larger surfaces directed outwardly and lying in the plane of the frame. This frame is connected by one of its four sides to a fixed frame 17' lying in the same level by means of a series of tensioned springs 18'. In addition there is a rigid, i. e., non-resilient connection to the fixed frame so that the path of the oscillatory motion is strictly limited. This non-resilient connection can comprise for example two links or bars 19' so that the filter can oscillate about the point of intersection of the two lines passing through the two pivotal pins 20' and 21' of each of these bars or links 19'.

The fixing or attachment of the wires 27 which are connected to the spring 18' to the movable frame is effected in a very simple manner in the outer limb 22' of the angle irons which possess apertures in these positions in which are inserted sockets through which the pivots 23' for the springs 18' pass.

To the limbs 22' of the angle irons are also fixed the strips 24' of the filter by the aid of small bolts 25 which project through the corresponding holes in the limbs of the angle irons.

The frames 16' are protected against deformation by two tensioned wires 26 which connect the two lower corners to the centre of the upper side of the frame.

The wires 27 which connect the upper and lower springs 18' with the frame 16' of the filter converge towards the centre of oscillation so that these springs need only have a few turns because their length does not alter considerably during an oscillation.

The springs 18' are arranged to equalise as far as possible the forces of inertia of the system when oscillating at its normal working speed.

The arrangement of the angle irons of the frame, whose larger limbs project outwardly and lie in the plane of the frame enables the simple fixing of the pivots 20' of the bars 19' and of the wires 27 to which the springs 18' are attached.

Since the lower angle iron of the frame tends to become distorted under the action of the bars or links 19' and the tension of the wires 26, the horizontal limb 28 of the angle iron is much larger than is the horizontal limb 29 of the upper angle iron. The corresponding limbs of the lateral angle iron diminish in width from bottom to top because the lateral angle irons tend to bend at their lower parts on account of the action of the tension in the strips. This construction of the frame is very advantageous because it diminishes the forces due to inertia. In point of fact the upper angle iron traverses a much greater path during an oscillation than does the lower angle iron and it is accordingly advantageous to reduce the weight of the upper angle iron.

Each strip 24' of the filter is, as has already been stated, directly fixed to the upper angle iron 29 or to one of the lateral angle irons by the aid of a small bolt 25. The strip is fixed to the lower angle iron of the frame through the intermediary of a small helical spring 31 which maintains the strip tensioned. In order to prevent any opposite displacement of the strip a series of metal wires 32 preferably extending in a direction as far as possible at right angles to the strips is stretched across the frame behind the strips which lie against the wires. The strips are then held tightly against each wire by the aid of a very fine metal wire 33 which is wound helically about the tensioned wire so that each winding embraces one strip. This enables the strips to be kept at the desired distance from one another and yet leaves them sufficiently free to respond to the tension of their springs in the longitudinal direction.

In Figure 1 the lenses 9 and 10 of the projectors are situated in the vision plane A—A—3—3 which includes the point 8 towards which the edges of all of the strips of the filters converge. The screen is represented at 4 and the frames of the filters are represented at 1/2, 1 and 2. The three filter screens 1/2, 1 and 2 are connected together by bars shown schematically in Figure 1. They receive their oscillating movements in a manner similar to that shown in Patent No. 1,772,782 by connecting the upper and lower ends 34, 35 of the vertical frame 16' to two wire cables 36 that meet at point 37 where they are connected to cable 38. Cable 38 passes over pulleys 39, secured by brackets 40 to frame 17', and is connected at point 41 to arm 42 secured to a shaft 43 journaled to be supported by frame 17'. Arm 44, also secured to shaft 43, is connected to any suitable source of rotary motion, not shown. It is thus seen that when arm 44 receives a rotary motion the cables 36 and 38 as well as the filter screens receive reciprocating movements. The oscillating movements of the three filters around the point 8 are such that the median lines of the three filters are always in a same plane passing through the point 8 the oscillating axis of which is the line 0—7, being the middle point of a straight line connecting 9 and 10. The result is that whatever may be the positions of the three filters during the oscillation, the outlines of the strips shown in Figure 2 always remain relatively the same so that a straight line passing through the middle points of the strips of the filters passes through the points 7 and 8. It can therefore be readily understood that the brightness diagrams remain constant.

What I claim is:

1. Apparatus for projecting stereoscopic pictures comprising, in combination, a projection screen, two projection devices operative to project two series of stereoscopic pictures upon the screen in stereoscopic relation, and filter means for obscuring the left eye picture elements from the right eye of an observer and obscuring the right eye picture elements from the left eye of the observer, said filter means comprising a plurality of spaced plane screens disposed in front of and adjacent to the projection screen and each filter screen being composed of a large number of closely spaced opaque strips, the said filter screens converging substantially to a common line of intersection in the plane of the projection screen formed by the intersection of the plane of the projection screen with a horizontal plane passing through the optical centers of the projection devices, the strips of the filter screen nearest the projection screen being of such relative width and so disposed as to limit one margin of each picture strip on the projection screen and the strips of the filter screen farthest from the projection screen being of such relative width and so disposed as to limit the other margin of each picture strip.

2. Apparatus for projecting stereoscopic pictures comprising, in combination, a projection screen, two projection devices operative to project two series of stereoscopic pictures upon the screen in stereoscopic relation, and filter means for obscuring the left eye picture elements from the right eye of an observer and obscuring the right eye picture elements from the left eye of the observer, said filter means comprising a plurality of spaced plane screens disposed in front of and adjacent to the projection screen and each filter screen being composed of a large number of closely spaced opaque strips, the said filter screens converging substantially to a common line of intersection in the plane of the projection screen formed by the intersection of the plane of the projection screen with a horizontal plane passing through the optical centers of the projection devices, the strips of the filter screen nearest the projection screen being of such relative width and so disposed as to limit one margin of each picture strip on the projection screen and the strips of the filter screen farthest from the projection screen being of such relative width and so disposed as to limit the other margin of each picture strip, and means for reciprocating the filter screens in their own planes as a unit and in fixed relation to each other.

3. Apparatus for projecting stereoscopic pictures comprising, in combination, a projection screen, two projection devices operative to project two series of stereoscopic pictures upon the screen in stereoscopic relation, and filter means for obscuring the left eye picture elements from the right eye of an observer and obscuring the right eye picture elements from the left eye of the observer, said filter means comprising a plurality of spaced plane screens disposed in front of and adjacent to the projection screen and each filter screen being composed of a large number of closely spaced opaque strips, the said filter screens converging substantially to a common line of intersection in the plane of the projection screen formed by the intersection of the plane of the projection screen with a horizontal plane passing through the optical centers of the projection devices, the strips of the filter screen nearest the projection screen being of such relative width and so disposed as to limit one margin of each picture strip on the projection screen and the strips of the filter screen farthest from the projection screen being of such relative width and so disposed as to limit the other margin of each picture strip, the strips of the filter screen nearest the projection screen being strips of narrow width alternating with strips of a wider width and the strips of the filter screen farthest from the projection screen being all of the same width, and the right and left edges of the successive strips of the filter screen farthest from the projection screen and of the successive narrow strips of the filter screen nearest the projection screen being alined with the optical centers of the respective right and left projection devices.

4. Apparatus for projecting stereoscopic pictures comprising, in combination, a projection screen, two projection devices operative to project two series of stereoscopic pictures upon the screen in stereoscopic relation, and filter means for obscuring the left eye picture elements from the right eye of an observer and obscuring the right eye picture elements from the left eye of the observer, said filter means comprising three spaced plane screens disposed in front of and adjacent to the projection screen and each filter screen being composed of a large number of closely spaced opaque strips, the said filter screens converging substantially to a common line of intersection in the plane of the projection screen formed by the intersection of the plane of the projection screen with a horizontal plane passing through the optical centers of the projection devices, the strips of the filter screen nearest the projection screen being of such relative width and so disposed as to limit one margin of each picture strip on the projection screen and the strips of the filter screen farthest from the projection screen being of such relative width and so disposed as to limit the other margin of each picture strip, the strips of the filter screen nearest the projection screen being strips of narrow width alternating with strips of a wider width and the strips of the filter screen farthest from the projection screen being all of the same width, and the right and left edges of the successive strips of the filter screen farthest from the projection screen and of the successive narrow strips of the filter screen nearest the projection screen being alined with the optical centers of the respective right and left projection devices, and the strips of the intermediate filter screen being of such relative width and so disposed that the right and left edges of successive strips of the intermediate filter screen are alined with the right and left edges respectively of successive strips of the filter screen farthest from the projection screen and with the right and left edges respectively of the successive narrow strips of the filter screen nearest the projection screen, whereby the penumbra at the edges of the picture strips is reduced.

EDMOND HENRI VICTOR NOAILLON.